United States Patent
Kollaritsch et al.

(10) Patent No.: US 7,066,509 B2
(45) Date of Patent: Jun. 27, 2006

(54) ENERGY ABSORPTION IMPACT SYSTEM AND METHOD FOR VEHICLE BUMPERS AND THE LIKE

(75) Inventors: Joseph C. Kollaritsch, Clarkston, MI (US); Jason Blust, Waterford, MI (US); Atalolo Dagba, Utica, MI (US)

(73) Assignee: Benteler Automotive Corporation, Auburn Hills, MI (US)

( * ) Notice: Subject to any disclaimer, the term of this patent is extended or adjusted under 35 U.S.C. 154(b) by 0 days.

(21) Appl. No.: 10/779,967

(22) Filed: Feb. 17, 2004

(65) Prior Publication Data

US 2005/0179268 A1   Aug. 18, 2005

(51) Int. Cl.
*B60R 19/34* (2006.01)

(52) U.S. Cl. .................. 293/133; 293/132; 293/155; 296/187.09

(58) Field of Classification Search ............ 293/132, 293/133, 155; 296/187.09, 203.02, 203.04
See application file for complete search history.

(56) References Cited

U.S. PATENT DOCUMENTS

| | | | |
|---|---|---|---|
| 4,272,114 A * | 6/1981 | Hirano et al. ............. 293/133 |
| 5,005,887 A * | 4/1991 | Kelman ..................... 293/120 |
| 5,314,229 A * | 5/1994 | Matuzawa et al. ..... 296/187.09 |
| 6,174,009 B1 * | 1/2001 | McKeon ................... 293/133 |
| 6,334,638 B1 * | 1/2002 | Yamamuro et al. ....... 293/133 |
| 6,409,239 B1 * | 6/2002 | Tjoelker et al. .......... 293/133 |
| 6,554,333 B1 * | 4/2003 | Shimotsu et al. ......... 293/132 |
| 6,648,385 B1 * | 11/2003 | Frank ....................... 293/133 |
| 6,702,345 B1 * | 3/2004 | Yoshida .................... 293/133 |
| 6,702,346 B1 * | 3/2004 | Wikstrom ................. 293/133 |
| 6,814,381 B1 * | 11/2004 | Frank ....................... 293/133 |
| 6,893,078 B1 * | 5/2005 | Saeki ................... 296/187.09 |

\* cited by examiner

*Primary Examiner*—D. Glenn Dayoan
*Assistant Examiner*—Greg Blankenship
(74) *Attorney, Agent, or Firm*—Price, Heneveld, Cooper, DeWitt & Litton, LLP

(57) ABSTRACT

An energy absorption impact system for vehicle bumpers and the like includes a mounting plate with a central opening therethrough, and a generally box-shaped sheet metal crush member. The crush member has a top wall, a bottom wall and opposite sidewalls arranged in a generally frustro-pyramidal shape, defining a large end connected with a vehicle bumper, and a small end connected with the mounting plate about the central opening. Impact on the vehicle bumper inelastically deforms the walls of the crush member toward the central opening in the mounting plate to absorb energy associated with the impact.

89 Claims, 7 Drawing Sheets

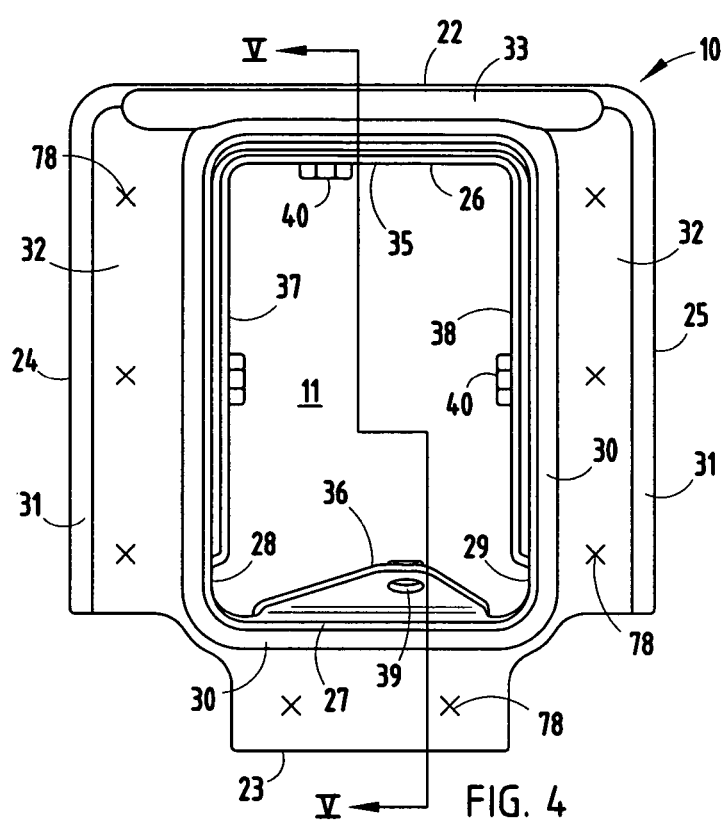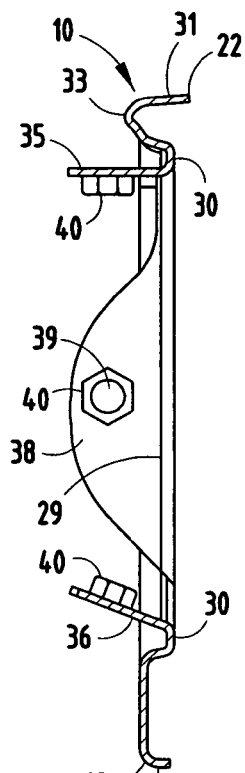
FIG. 4
FIG. 5
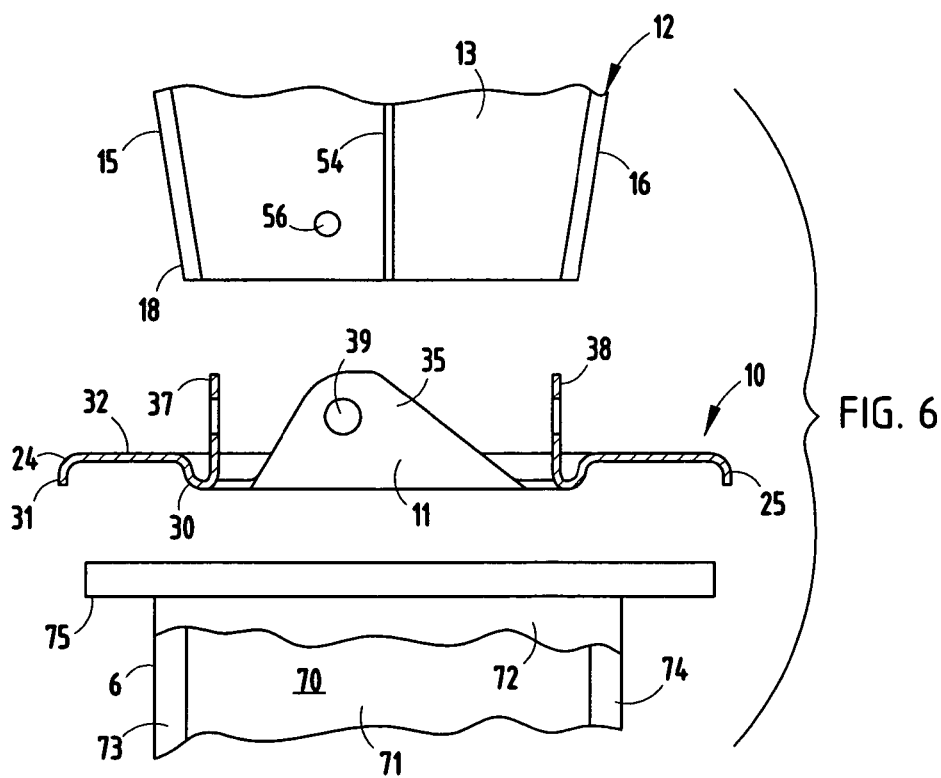
FIG. 6

ENERGY ABSORPTION IMPACT SYSTEM AND METHOD FOR VEHICLE BUMPERS AND THE LIKE

BACKGROUND OF THE INVENTION

The present invention relates to impact absorbing devices, and in particular to an energy absorbing impact system and method for vehicle bumpers and the like.

Typical automotive bumper systems include three basic components. The first component is a decorative fascia, usually constructed of plastic or the like. The second component is a rigid impact beam, typically constructed of roll formed or stamped steel, which supports the decorative fascia. The third element is an energy absorption unit or assembly that operably connects the impact beam to the frame rails of an associated vehicle. These three components are designed to meet the performance requirements for both low and high speed impacts.

It is beneficial to design the bumper system in such a way that limited damage is transferred to the vehicle frame rails under impact. One guideline provided for this design process is for the bumper system to have a peak loading capability equivalent to around 85 percent of the combined rail capacity. This assures that the energy absorption unit will crush first upon impact before loading is imparted to the frame rails. It is also beneficial that the bumper system be designed so that energy can be absorbed in a controlled and repeatable manner. This allows for consistency in vehicle crash behavior.

Examples of energy absorption units in bumper systems can be found in U.S. Pat. Nos. 5,224,574; 6,231,095 and 6,409,239, which disclose various structures and methods for meeting the energy absorption targets for certain vehicle bumper systems. However, many of such prior devices include certain shortcomings, including inconsistency in deformation and resultant energy absorption, instability in lateral loading, high manufacturing costs, post impact damage visibility, and large profiles unsuitable for compact bumper designs. Also, while some of these prior bumper systems are relatively effective in absorbing the energy associated with a front end collision, they are not equally effective with side hits or collisions of the type having a significant side component, particularly for high speed crashes.

Hence, a need still exists for an energy absorption system that is compact, lightweight, inexpensive to manufacture, has predictable energy absorption characteristics, and incorporates a relatively simple design that can be readily adapted for a wide variety of different bumper applications.

SUMMARY OF THE INVENTION

One aspect of the present invention is an energy absorption impact system for vehicle bumpers and the like, which includes a mounting plate with a central opening therethrough, and a generally box-shaped sheet metal crush member. The crush member has a top wall, a bottom wall and opposite sidewalls arranged in a generally frustro-pyramidal shape, defining a larger end connected with a vehicle bumper, and a smaller end connected with the mounting plate about the central opening. Impact on the vehicle bumper inelastically deforms the walls of the crush member toward the central opening in the mounting plate to absorb energy associated with the impact.

Another aspect of the present invention is a method for making an energy absorption impact system for vehicle bumpers and the like, comprising forming a mounting plate with a central opening therethrough, and forming a generally box-shaped, sheet metal energy absorbing crush member having a top wall, a bottom wall and opposite sidewalls arranged in a generally frustro-pyramidal shape, defining a larger end thereof adapted for connection with a vehicle bumper, and a smaller end thereof adapted for connection with the mounting plate. The method also includes positioning the smaller end of the crush member on the mounting plate about the central opening, rigidly fastening the smaller end of the crush member to the mounting plate, rigidly fastening the mounting plate to the end of a vehicle frame, and connecting a vehicle bumper to the larger end of the crush member, whereby impact on the vehicle bumper inelastically deforms the walls of the crush member toward the central opening in the mounting plate to absorb energy associated with the impact.

Another aspect of the present invention provides an energy absorption impact system that is particularly adapted for high speed crashes and side hit collisions. The mounting plate serves to direct the deformation of the crush box during energy absorption. The tapered construction of the crush member provides a very simple, low cost design that can be readily adapted for a wide variety of different applications by simply varying the thickness of the walls and/or the degree of taper or draft of the walls relative to the mounting plate. Furthermore, the size and thickness of the mounting plate can be readily varied to achieve different energy absorption characteristics. The energy absorbing impact system is relatively lightweight, can be inexpensively manufactured, and has a very compact design that can be used in narrow bumper applications.

These and other advantages of the invention will be further understood and appreciated by those skilled in the art by reference to the following written specification, claims, and appended drawings.

BRIEF DESCRIPTION OF THE DRAWINGS

FIG. 4 is a rear elevational view of a mounting plate portion of the crush box assembly.

FIG. 5 is a vertical cross-sectional view of the mounting plate, taken along the line V—V, FIG. 4.

FIG. 6 is an exploded view of the crush box assembly and an associated vehicle frame.

DETAILED DESCRIPTION OF THE PREFERRED EMBODIMENTS

Figure 1:
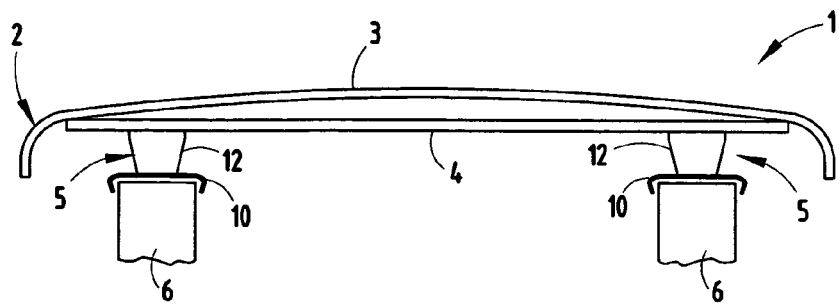
FIG. 1 is a partially schematic, plan view of an energy absorption impact system embodying the present invention.

For purposes of description herein the terms "upper", "lower", "right", "left", "rear", "front", "vertical", "horizontal" and derivative thereof shall relate to the invention as installed on the front bumper of an associated vehicle. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The reference numeral 1 (FIG. 1) generally designates an energy absorption impact system or apparatus embodying the present invention, which is particularly adapted for use in conjunction with the illustrated vehicle bumper assembly 2 of the type having a fascia member 3 supported by a rigid impact or reinforcing beam 4. A pair of crush box assemblies 5 are positioned between and attach beam 4 to an associated pair of vehicle frame rails 6.

Figure 2:
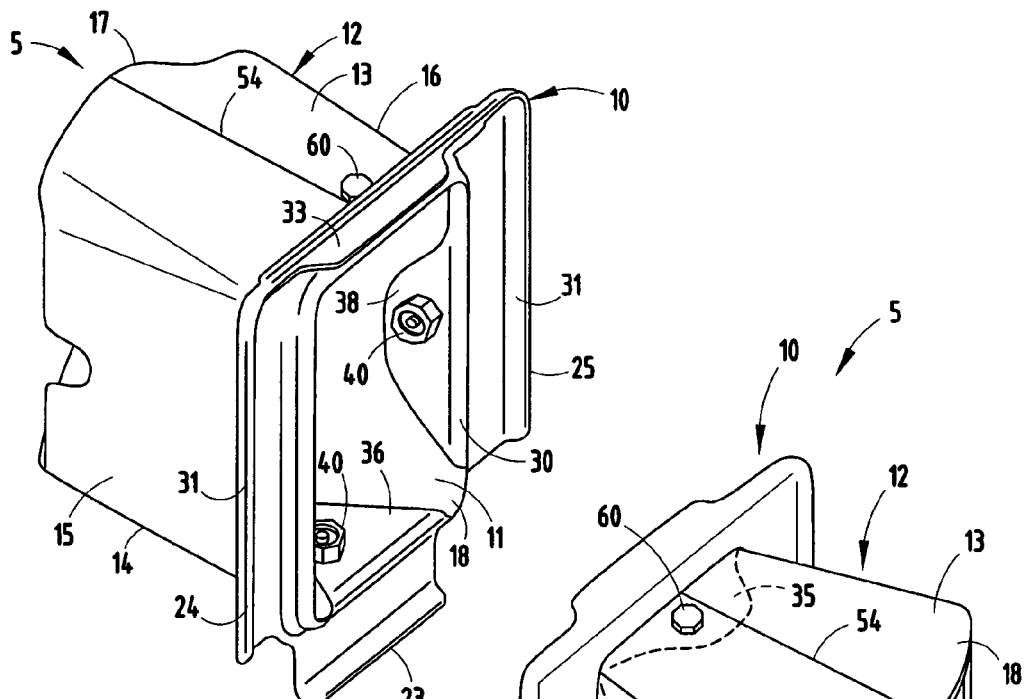
FIG. 2 is a perspective view of a crush box assembly portion of the energy absorption impact system taken from a rear side thereof.
Figure 3:
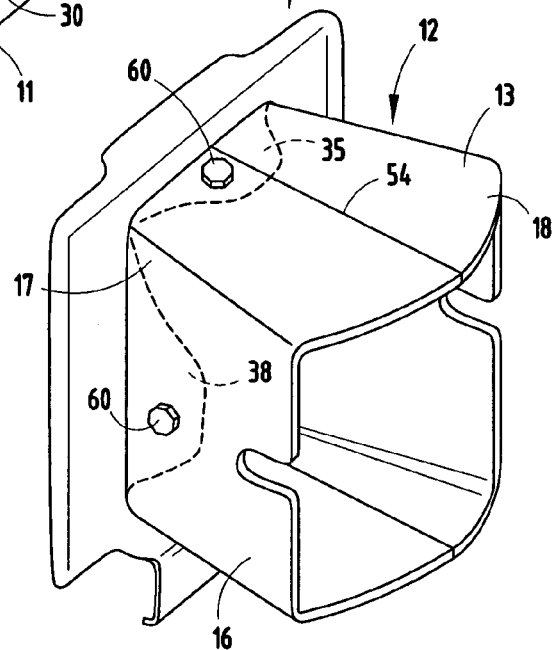
FIG. 3 is a perspective view of the crush box assembly taken from a front side thereof.

With reference to FIGS. 1–3, in the illustrated embodiment of the present invention, the two crush box assemblies 5 are substantially identical in construction, and each includes a mounting plate 10 with a central opening 11 therethrough, and a generally box-shaped sheet metal crush member 12. The crash box or crush member 12 has a top wall 13, a bottom wall 14 and opposite sidewalls 15 and 16 arranged in a generally frusto-pyramidal shape, defining a larger end 17 connected with a portion of bumper assembly 2, such as reinforcing beam 4, and a smaller end 18 connected with mounting plate 10 about central opening 11. Impact on bumper assembly 2 inelastically deforms the walls 13–16 of crush member 12 toward the central opening 11 in mounting plate 10 to absorb energy associated with the impact.

With reference to FIGS. 2–6, the illustrated mounting plate 10 is formed from sheet metal or the like, such as high strength steel, and has a generally rectangular plan configuration having an outer periphery defined by top edge 22, bottom edge 23 and opposite side edges 24 and 25. Opening 11 is disposed centrally within mounting plate 10, and also has a generally rectangular plan configuration with an inner periphery defined by a top edge 26, a bottom edge 27 and opposite side edges 28 and 29. In the example illustrated in FIGS. 2–6, a U-shaped supporting groove or channel is disposed about edges 26–29 of opening 11, and serves to form a pocket retainer for crush member 12, and also to form a stiffening bead to rigidify mounting plate 10. Furthermore, the outer periphery of mounting plate 10 also includes a radiused, inwardly turned stiffening flange 31 extending along edges 22–25, which also serves to rigidify mounting plate 10 for purposes to be described in greater detail herein below. An outer portion 32 of mounting plate 10 is disposed between stiffing bead 30 and stiffening flange 31, is generally flat, and is configured to attach crush box assembly 5 to an associated vehicle frame rail 6. The illustrated mounting plate 10 also includes a top stiffening bead 33 disposed in the outer portion 32 of mounting plate 10, between edges 22 and 26, and having a generally U-shaped lateral cross-sectional shape which protrudes rearwardly toward frame rail 6. As best illustrated in FIG. 4, the lower corners of mounting plate 10 are preferably removed to reduce the weight of crush box assembly 5. The thickness of mounting plate 10 can be varied to achieve a specific energy absorption characteristic, and the size and shape of supporting groove or stiffening bead 30, stiffening flange 31, and top stiffening bead 33 can also be varied to achieve the desired energy absorption. For example, the depth and/or width of groove 30 can be adjusted to vary the deformation of mounting plate 20 during impact, thereby altering the effective length of crush box assembly 5.

The illustrated mounting plate 10 (FIGS. 1–6) also includes four tabs 35–38, which extend forwardly from central opening 11 at edges 26–29. Side tabs 37 and 38 have a generally arcuate side elevational configuration, and extend along a substantial portion of the associated side edges 28 and 29 of central opening 11. Top and bottom tabs 35 and 36 have a generally triangular configuration, and extend along a substantial portion of the top and bottom edges 26 and 27 of central opening 11. As best illustrated in FIG. 6, side tabs 37 and 38 are formed substantially perpendicular to the outer portion 32 of mounting plate 10. Each of the tabs 35–38 includes a fastener aperture 39 which extends laterally therethrough, with a weld nut 40 attached to the interior surface of the associated tab to facilitate attachment of crush member 12 to mounting plate 10, as described below. As best illustrated in FIG. 5, top tab 35 is formed substantially perpendicular to the outer portion 32 of mounting plate 10, while bottom tab 36 is oriented at a predetermined acute angle relative to the outer portion 32 of mounting plate 10. Preferably, each tab 35–38 is integral with mounting plate 10 to define a one-piece structure, and may be formed by stamping the same from the material disposed within central opening 11, and bending the tabs forwardly along the associated edges 26–29 or fold lines. As discussed in greater detail below, tabs 35–38 serve as tension straps for the walls 13–16 of crush member 12 during energy absorption. The thickness, size and shape of tabs 35–38 may be varied to achieve a specific energy absorption characteristic.

With reference to FIGS. 2–3 and 7–12, the illustrated crush member 12 has walls 13–16 arranged in the shape of a frustum of a pyramid to create a frustro-pyramidal shape. In the example illustrated in FIGS. 7–9, top wall 13 and bottom wall 14 are substantially identical in size, shape and orientation, and sidewalls 15 and 16 are substantially identical in size, shape and orientation, so as to define a frustum of a rectangular pyramid or obelisk. However, it is to be understood that the term "frustro-pyramidal", as used herein, is intended to cover any frustum of a pyramid shape.

Figure 7:
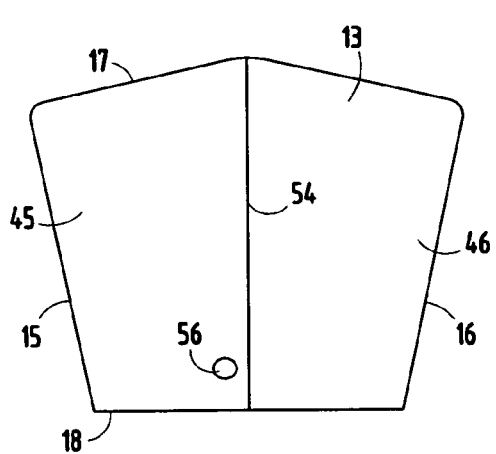
FIG. 7 is a top plan view of a crush member portion of the crush box assembly.
Figure 8:
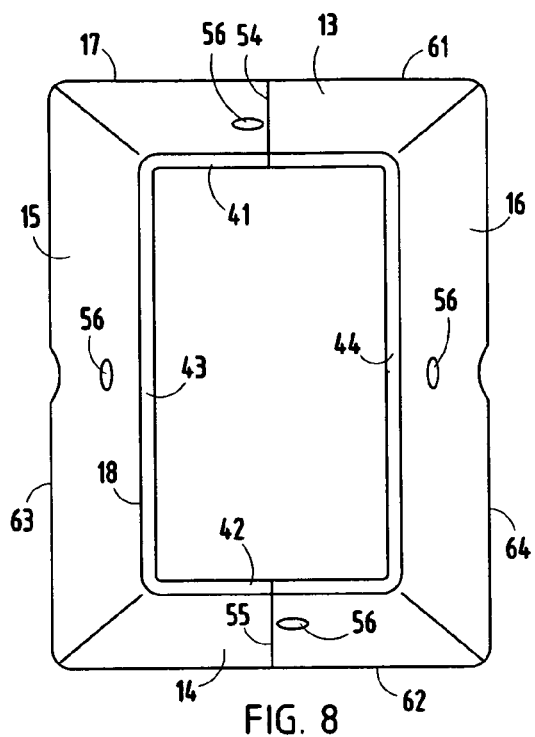
FIG. 8 is a rear elevational view of the crush member.
Figure 9:
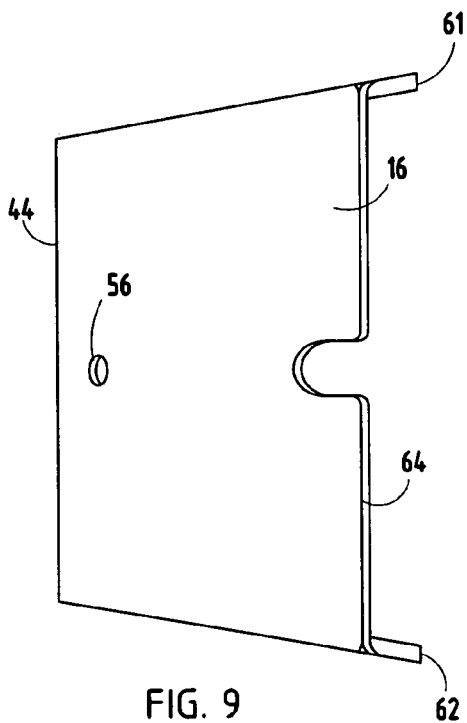
FIG. 9 is a side elevational view of the crush member.
Figure 10:
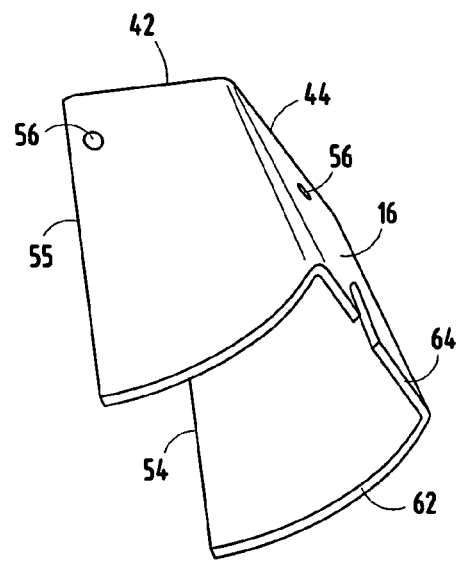
FIG. 10 is a perspective view of a C-shaped channel portion of the crush member.

In the illustrated examples, the sidewalls 15 and 16 of crush member 12 are longer than the width of top and bottom walls 13 and 14, so as to define the rectangular appearance shown in FIGS. 8 and 9. With reference to FIGS. 7–9, the illustrated crush member 12 is defined by edges 41–44 at smaller end 18, and edges 61–64 at larger end 17. In the example shown in FIGS. 2–9, crush member 12 is constructed from two channel members 45 and 46, each of which has a substantially identical C-shaped lateral cross-sectional configuration, with opposed side edges 47 and 48 (FIG. 10), and opposite end edges 49 and 50. Each channel member 45 and 46 includes a top flange 51, a bottom flange 52 and a side web 53 integrally connecting flanges 51 and 52. The illustrated flanges 51 and 52 have a generally trapezoidal plan configuration to provide the taper for sidewalls 15 and 16. Furthermore, web 53 may also have a trapezoidal plan configuration to provide for the tapered shape of top and bottom walls 13 and 14.

The two channel members 45 and 46 are positioned facing one another, with their opposite side edges 47 and 48 mutually abutting. The abutting side edges 47 and 48 are rigidly interconnected by means such as MIG welding, spot welding, or the like, which forms seams 54 and 55. In the example illustrated in FIGS. 2–9, seams 54 and 55 are disposed in the top and bottom walls 13 and 14 respectively of crush member 12. In the illustrated example, each of the crush member walls 13–16 includes a fastener aperture 56 extending laterally therethrough to facilitate attachment of crush member 12 to mounting plate 10 in the manner described below.

Crush member 12 may be constructed from a high boron, low to medium carbon steel of the type disclosed in U.S. Pat. No. 5,972,134. One suitable steel by Applicants' Assignee, Benteler Corporation, is known in the trade as "DB9O", and preferably does not require hardening. Steels know as "HSLA" are also suitable. Due to different application requirements, it can be assumed that the above materials could be coated or plated, (i.e., E-coat galvaneal, galvanize, or a combination of).

Figure 11:
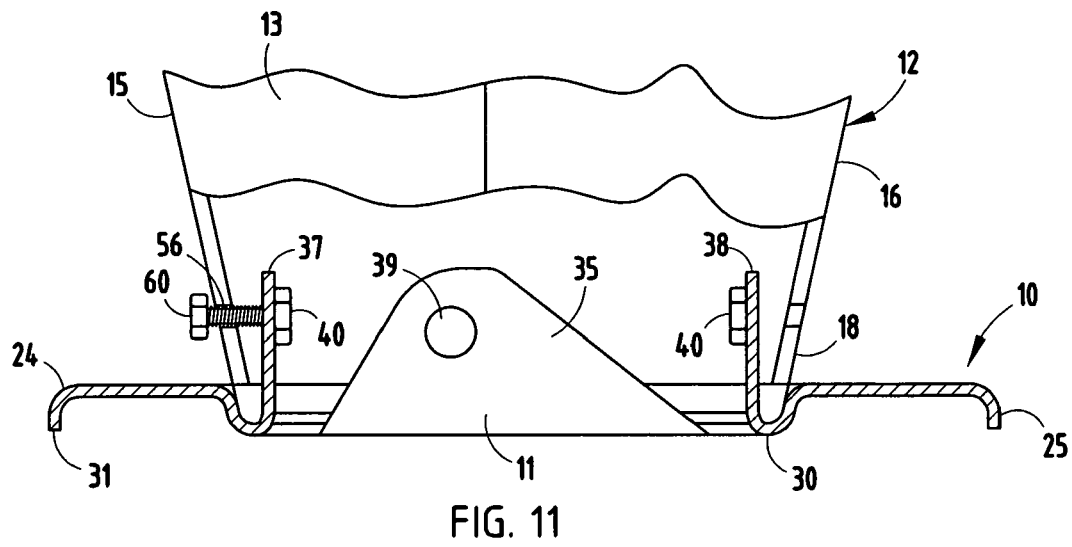
FIG. 11 is a fragmentary, cross-sectional view of the crush box assembly showing the crush member positioned on the mounting plate, but not yet fastened in place.
Figure 12:
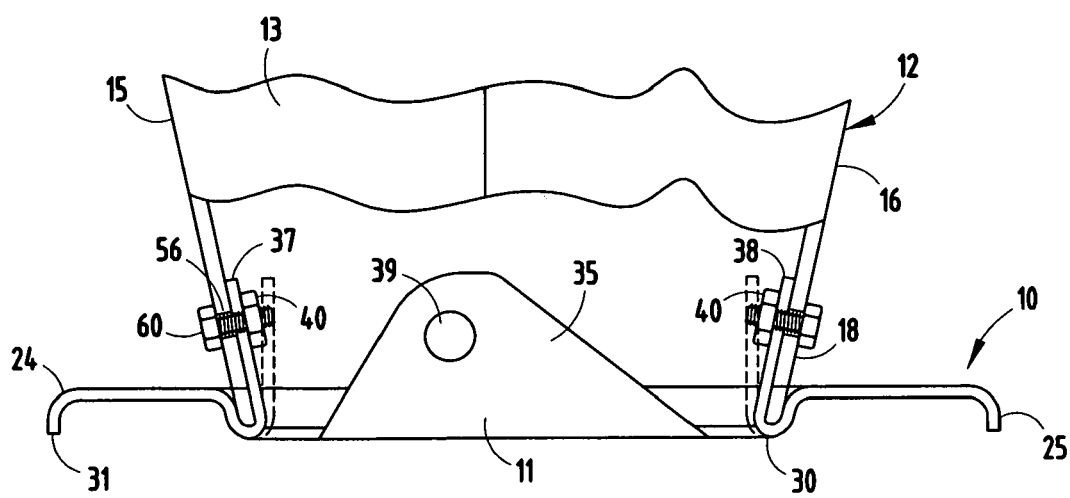
FIG. 12 is a fragmentary, cross-sectional view of the crush box assembly, showing the crush member fully assembled on the mounting plate.

In one example of the present invention, crush member 12 is attached to mounting plate 10 in the following manner. With reference to FIGS. 11 and 12, the smaller end 18 of crush member 12 is positioned within the supporting groove or stiffening bead 30 of mounting plate 10, such that tabs 35–38 extend along the interior surfaces of crush member 12. It is noteworthy that when so positioned, each of the walls 13–16 of crush member 12 is disposed at a predetermined acute angle with respect to the outer portion 32 of mounting plate 10. However, at least the side tabs 37 and 38 and top tab 35 are disposed generally perpendicular to the outer portion 32 of mounting plate 10, such that a gap exists between tabs 35, 37 and 38 and the interior surfaces of crush member 12. In the partially assembled condition illustrated in FIG. 11, threaded fasteners 60 are inserted through the aligned fastener apertures 56 and 39 in crush member 12 and tabs 35–38 respectively. The free ends of fasteners 60 are engaged in weld nuts 40. The tightening of fasteners 60 resiliently draws tabs 35 and 37–38 against the interior surfaces of crush member 12 in the manner illustrated in FIG. 11 to preload fasteners 60, so as to securely yet detachably interconnect crush member 12 with mounting plate 10 in a manner which does not require separate lock washers, such as Belleville washers, or the like. The elastic deformation of tabs 35 and 37–38 serves the function of a spring washer or other similar retainer, thereby reducing both cost and weight. Fasteners 60 also detachably connect crush member 12 with mounting plate 10, such that the crush member can be removed and replaced if necessary.

It is to be understood that crush member 12 and mounting plate 10 can be interconnected using alternate devices and/or processes, such as rivets or other types of mechanical fasteners. Also, crush member 12 and mounting plate 10 can be welded or adhered together by means such as spot welds, or the like, which would require system replacement upon significant impact.

Figure 13:
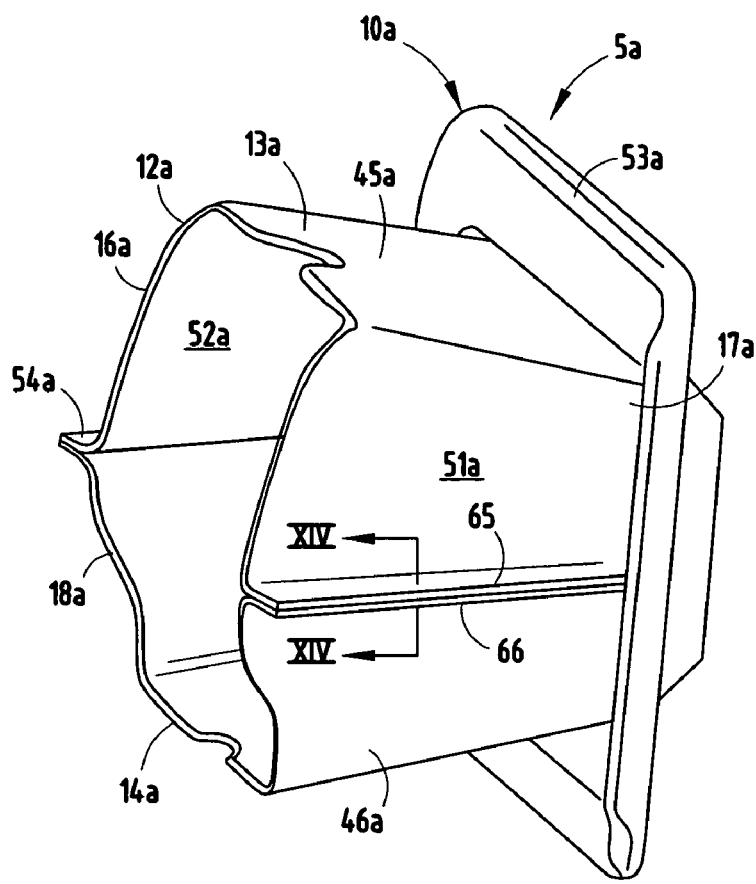
FIG. 13 is a perspective view of another embodiment of the crush box assembly.
Figure 14:
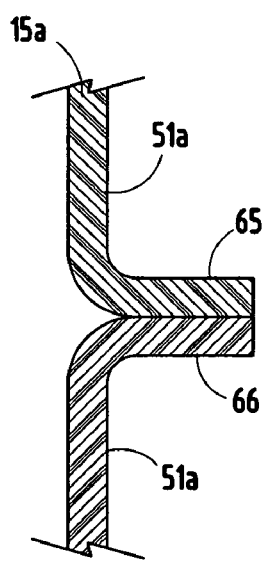
FIG. 14 is a fragmentary, vertical cross-sectional view of the crush box assembly shown in FIG. 13.

The reference numeral 5a generally designates another embodiment of the present invention. Since crush box assembly 5a is similar to the previously described crush box assembly 5, similar parts appearing in FIGS. 2–12 and 13–14 respectively are represented by the same, corresponding reference numeral, except for the suffix "a" in the numerals of the latter. In the illustrated crush box assembly 5a, crush member 12a is similarly constructed from two channel members 45a and 46a. However, channel members 45a and 46a are mutually connected along horizontal seams 54 and 55 of crush member 12. More specifically, in the example illustrated in FIGS. 13 and 14, the edges 47a and 48a of channel members 45 and 46 have outwardly extending flanges 65 and 66, which are oriented to abuttingly engage one another along the sidewalls 15a and 16a of crush member 12a. Preferably, flanges 65 and 66 are rigidly interconnected by spot weld 67.

In both embodiments of the present invention, the crush box assembly 5 and/or 5a is attached to an associated frame rail 6 in the following manner. In the example illustrated in FIG. 6, frame rail 6 is in the nature of a square beam having a hollow interior 70 defined by opposite walls 71–74. A plate-shaped mounting flange 75 is attached to the free end of frame rail 6, and includes a central aperture therein, which is shaped similar to the interior 70 of frame rail 6, such that mounting plate 10 can be received therein. The illustrated crush box assembly 5 is positioned on top of mounting flange 7 by centering mounting plate 10 thereover, and positioning the interior surface of the outer portion 32 of mounting plate 10 abuttingly on the exterior face of mounting flange 75. In this position, the stiffening bead 30 of mounting plate 10 is positioned slightly within the interior 70 of frame rail 6. The outer portion 32 of mounting plate 10 is then fixedly attached to the exterior face of flange 75 by means such as welding or the like, such as the spot welds 78 shown in FIG. 4. In the example illustrated in FIG. 1, reinforcing beam 4 is then rigidly attached to the larger end 17 of crush member 12, and fascia member 3 is attached to beam 4.

Figure 15:
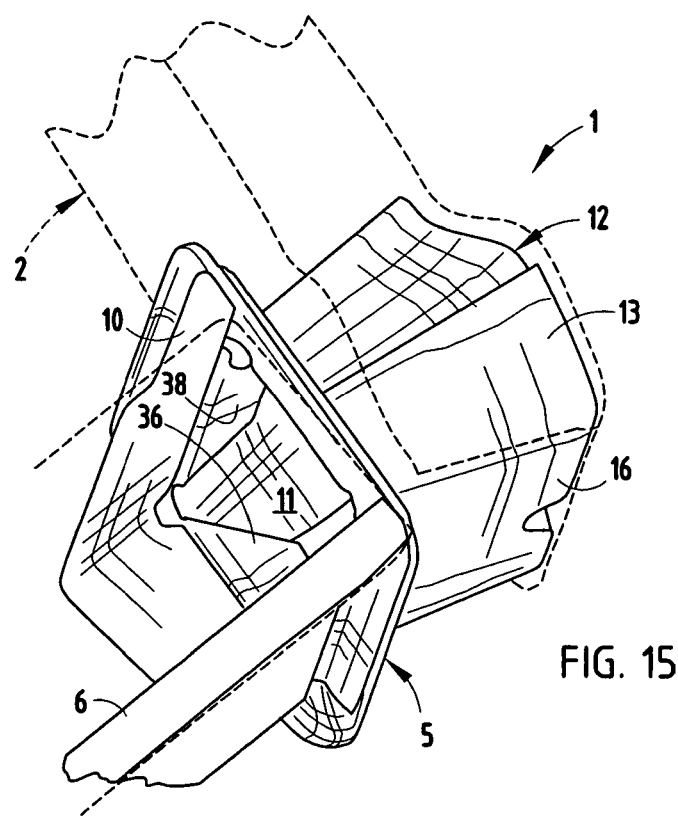
FIG. 15 is a partially schematic, perspective view of a crush box assembly mounted on a frame rail, prior to collision.

With reference to FIGS. 15–18, impact on the vehicle bumper assembly 2 inelastically deforms the top wall 13, bottom wall 14 and opposite sidewalls 15 and 16 of crush member 12 toward the central opening 11 in mounting plate 10 to absorb energy associated with the impact. In the example shown in FIGS. 15–18, the impact is in the nature of a side hit, which has a substantially vertical side component, such that crush member 12 tends to deform largely along the exterior sidewall 16. Impact at an angle of around 30 degrees to the surface of the center of fascia member 3 is one example of a side hit reflected in FIGS. 15–18. In the embodiment shown in FIGS. 15–18, the bumper 2a has soft formed ends attached to the two crush box assemblies 5, instead of the face bar attachment shown in FIG. 1. FIG. 15 shows the crush box assembly 5 along with the frame rail 6 and associated bumper 2 before collision. During a high speed collision having a substantial side impact, the exterior sidewall 16 of crush member 12 buckles inwardly into a roughly concave configuration, thereby drawing the edge 61 of crush member 12 downwardly and inwardly toward the interior 70 of frame rail 6. The top and bottom walls 13 and 14 of crush member 12 are bulged outwardly into a roughly convex configuration. Simultaneously, mounting plate 10 inelastically deforms, which in the example shown in FIGS. 16 and 17, drives the outer portion 32 of mounting plate 10 toward central opening 11, thereby folding the mounting plate inwardly toward the interior of frame rail 6. The frustroconical shape of crush member 12, in conjunction with the configuration of mating mounting plate 10, produces very predictable energy absorption characteristics that are quite advantageous to meet a wide variety of vehicle standards. The deformation of crush box assembly 5 absorbs the energy of the impact, and isolates the frame rails 6 to avoid damage to the same. Crush box assembly 5 may fold into the interior 70 of frame rail 6 under extreme collisions. The taper of crush member walls 13–16, with the larger end 17 forward, serves to control the deformation of crush member 12. The tables 35–38 serve as tension straps for crush member walls 13–16 as the crush member 12 folds inwardly toward, and sometimes through, the central opening 11 of mounting plate 10. Tabs 35–38 predictably resist this deformation to absorb the energy of the impact.

Figure 16:
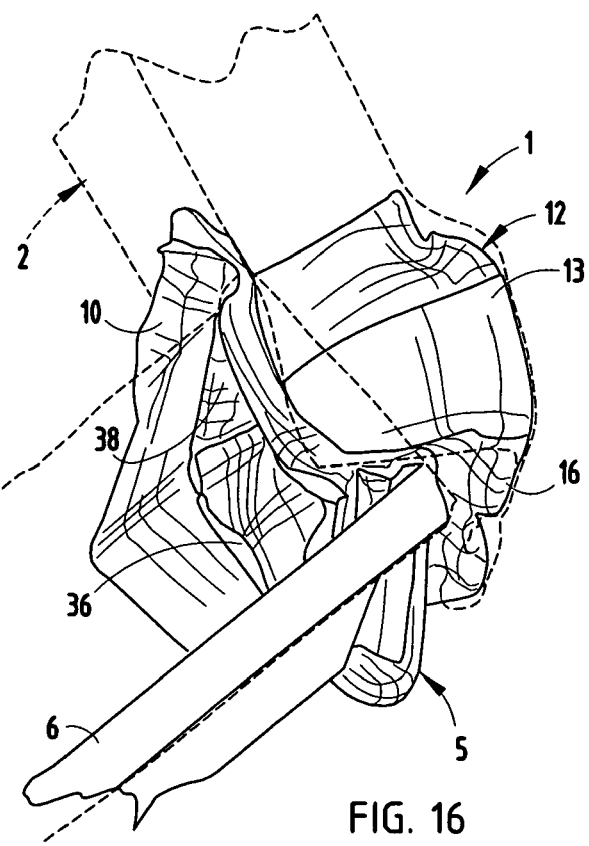
FIG. 16 is a partially schematic, perspective view of the crush box assembly and frame rail shown in FIG. 15 at initial impact of the type having substantial side component.
Figure 17:
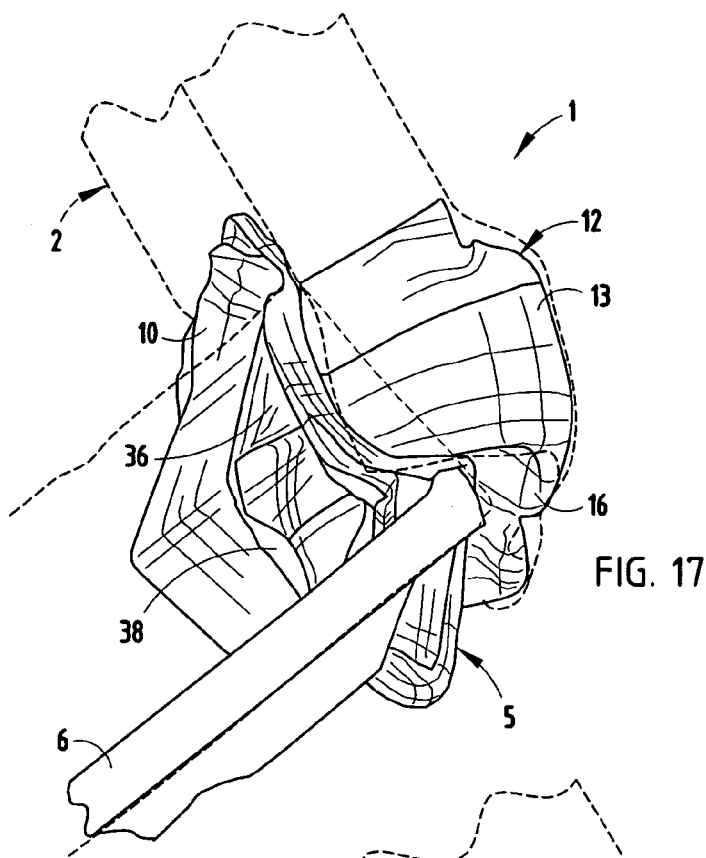
FIG. 17 is a partially schematic, perspective view of the crush box assembly and frame rail shown in FIGS. 15 and 16 during impact.
Figure 18:
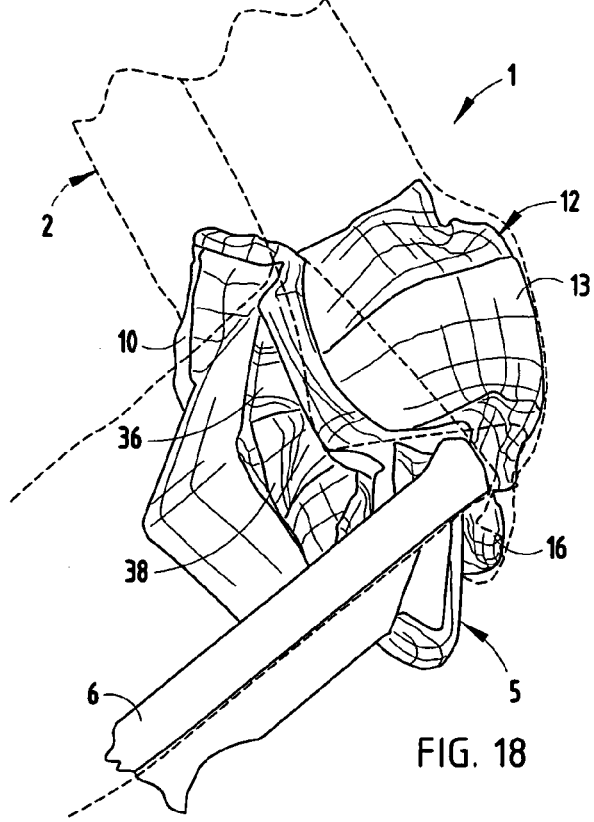
FIG. 18 is a partially schematic, perspective view of the crush box assembly and frame rail shown in FIGS. 15–17 after impact.

The impact illustrated in FIGS. 15–17 is sufficiently severe as to require replacement of the entire crush box assembly 5. The spot welds that attach mounting plate 10 to frame flange 75 are drilled out to remove the crush box assembly 5 from frame rail 6. A new crush box can be attached to frame flange 75 using bolts, or the like. In the event mounting plate 10 is not damaged, the crush member 12 is removed from mounting plate 10 by detaching fasteners 60. A new crush member 12 may then be installed on mounting plate 10 using new fasteners 60.

Preferably, crush box assemblies 5 and 5a are manufactured using the same basic design, but varying the configuration slightly to achieve the desired energy absorption characteristics for a specific bumper application. More specifically, the predetermined acute angle of one or more of the top wall 13, bottom wall 14 and sidewalls 15 and 16 of crush member 12 can be varied to achieve different energy absorption and/or adapt the crush box assembly for collisions having a specified side impact component. Furthermore, the thickness of the top wall 13, bottom wall 14 and sidewalls 15 and 16 of crush member 12 can be similarly varied to achieve more or less energy absorption. The width and length of crush member 12 can also be varied to achieve the desired energy absorption characteristics. Also, the thickness of mounting plate 10 and in particular the construction of tabs 35–38, channel 30 and stiffening bead 33 will serve to vary the energy absorption characteristics of the crush box assemblies 5 and 5a.

In each of the embodiments described herein, the energy absorption impact system 1 is particularly adapted for use with a vehicle bumper or the like, and achieves controlled and consistent energy absorption performance, yet is economical to manufacture, and can be easily installed and/or replaced. The frustroconical shape of crush member 12, in conjunction with mounting plate 10, serves to provide a very uncomplicated design that can be easily varied to adapt the energy absorption system for a wide variety of different applications. Furthermore, crush box assemblies 5 and 5a have a very compact design to fit into tight spaces, yet are capable of meeting energy absorption requirement, even for high speed and/or side impacts.

In the foregoing description, it will be readily appreciated by those skilled in the art that modifications may be made to the invention without departing from the concepts disclosed herein. Such modifications are to be considered as included in the following claims, unless these claim, by their language, expressly state otherwise.

The invention claimed is:

1. In a vehicle having a frame and a bumper, the improvement of an energy absorption impact system, comprising:
    a mounting plate operably connected with said frame, and including a central opening extending therethrough; and
    a generally box-shaped, sheet metal energy absorbing crush member having a top wall, a bottom wall and opposite sidewalls arranged in a generally frustro-pyramidal shape, defining a larger end thereof operably connected with said bumper, and a smaller end thereof operably connected with said mounting plate about said central opening therein, whereby impact on said bumper inelastically deforms said top wall, said bottom wall and said opposite sidewalls of said crush member toward said central opening in said mounting plate to absorb energy associated with the impact.

2. An energy absorption impact system as set forth in claim 1, wherein:
    said mounting plate includes at least one tab extending forwardly from said central opening and being rigidly connected with an adjacent one of said top wall, said bottom wall and said opposite sidewalls of said crush member.

3. An energy absorption impact system as set forth in claim 2, wherein:
    said tab is connected with an interior surface of said one wall of said crush member, and folds inwardly with said one wall toward said central opening of said mounting plate upon impact to control energy absorption.

4. An energy absorption impact system as set forth in claim 4, wherein:
    said sidewalls include an innermost sidewall facing a central portion of said bumper, and an outermost sidewall facing an end portion of said bumper; and
    said tab is rigidly connected with the interior surface of said outermost sidewall to absorb energy from an impact having a significant side component.

5. An energy absorption impact system as set forth in claim 4, wherein:
    said tab is integral with said mounting plate to define a one-piece structure.

6. An energy absorption impact system as set forth in claim 5, wherein:
    said tab is stamped from material disposed within said central opening and bent forwardly along a fold edge.

7. An energy absorption impact system as set forth in claim 6, wherein:
    said mounting plate includes a stiffening bead extending about the periphery of said central opening.

8. An energy absorption impact system as set forth in claim 7, wherein:
    said central opening is defined by a top edge, a bottom edge and opposite side edges; and
    each of said edges of said central opening includes one of said tabs extending forwardly therefrom.

9. An energy absorption impact system as set forth in claim 8, wherein:
    at least one of said sidewalls is disposed at a predetermined acute angle relative to an adjacent outer portion of said mounting plate to define at least a portion of said generally frustro-pyramidal shape.

10. An energy absorption impact system as set forth in claim 8, wherein:
    each of said sidewalls is disposed at a predetermined acute angle relative to an adjacent outer portion of said mounting plate to define at least a portion of said generally frustro-pyramidal shape.

11. An energy absorption impact system as set forth in claim 10, wherein:
said top wall is disposed at a predetermined acute angle relative to an adjacent outer portion of said mounting plate to define at least a portion of said generally frustro-pyramidal shape.

12. An energy absorption impact system as set forth in claim 11, wherein:
said bottom wall is disposed at a predetermined acute angle relative to an adjacent outer portion of said mounting plate to define at least a portion of said generally frustro-pyramidal shape.

13. An energy absorption impact system as set forth in claim 12, wherein:
said predetermined acute angle of each of said sidewalls of said crush member is substantially identical.

14. An energy absorption impact system as set forth in claim 13, wherein:
said predetermined acute angle of said top wall and said bottom wall of said crush member is substantially identical.

15. An energy absorption impact system as set forth in claim 14, wherein:
said predetermined acute angle of said top wall, said bottom wall and said opposite sidewalls is adjusted to vary the energy absorption for a specified impact system.

16. An energy absorption impact system as set forth in claim 15, wherein:
said top wall, said bottom wall and said sidewalls each have a predetermined thickness which is adjusted to vary the energy absorption for a specified impact system.

17. An energy absorption impact system as set forth in claim 16, wherein:
said crush member comprises first and second channel members, each having a substantially identical C-shaped lateral cross-sectional configuration with opposed side edges thereof rigidly interconnected along opposite seams to define said generally frustro-pyramidal shape.

18. An energy absorption impact system as set forth in claim 17, wherein:
said opposed seams are disposed in said top wall and said bottom wall.

19. An energy absorption impact system as set forth in claim 17, wherein:
said opposed seams are disposed in said sidewalls.

20. An energy absorption impact system as set forth in claim 19, wherein:
said mounting plate has a generally flat outer portion, with a marginal edge having a stiffening bead extending along at least a portion thereof; and
said outer portion of said mounting plate is spot welded to an open forward end of said frame.

21. An energy absorption impact system as set forth in claim 20, including:
fasteners detachably connecting said top wall, said bottom wall and said opposite sidewalls with said tabs to facilitate replacement of said crush member.

22. An energy absorption impact system as set forth in claim 21, wherein:
said tabs are disposed at an angle relative to the outer portion of said mounting plate which is greater than the predetermined acute angle of said top wall, and said opposite sidewalls, such that said fasteners resiliently bias said tabs abuttingly against said walls to preload said fasteners and securely retain the same in place.

23. An energy absorption impact system as set forth in claim 22, including:
weld nuts attached to said tabs and receiving said fasteners therein.

24. An energy absorption impact system as set forth in claim 23, wherein:
said mounting plate and said crush member are constructed from high strength steel.

25. An energy absorption impact system as set forth in claim 2, wherein:
said sidewalls include an innermost sidewall facing a central portion of said bumper, and an outermost sidewall facing an end portion of said bumper; and
said tab is rigidly connected with the interior surface of said outermost sidewall to absorb energy from an impact having a significant side component.

26. An energy absorption impact system as set forth in claim 2, wherein:
said tab is integral with said mounting plate to define a one-piece structure.

27. An energy absorption impact system as set forth in claim 2, wherein:
said tab is stamped from material disposed within said central opening and bent forwardly along a fold edge.

28. An energy absorption impact system as set forth in claim 1, wherein:
said mounting plate includes a stiffening bead extending about the periphery of said central opening.

29. An energy absorption impact system as set forth in claim I, wherein:
said central opening is defined by a top edge, a bottom edge and opposite side edges; and
each of said edges of said central opening includes a tab extending forwardly therefrom.

30. An energy absorption impact system as set forth in claim 1, wherein:
at least one of said sidewalls is disposed at a predetermined acute angle relative to an adjacent outer portion of said mounting plate to define at least a portion of said generally frustro-pyramidal shape.

31. An energy absorption impact system as set forth in claim 1, wherein:
each of said sidewalls is disposed at a predetermined acute angle relative to an adjacent outer portion of said mounting plate to define at least a portion of said generally frustro-pyramidal shape.

32. An energy absorption impact system as set forth in claim 31, wherein:
said predetermined acute angle of each of said sidewalls of said crush member is substantially identical.

33. An energy absorption impact system as set forth in claim 1, wherein:
said top wall is disposed at a predetermined acute angle relative to an adjacent outer portion of said mounting plate to define at least a portion of said generally frustro-pyramidal shape.

34. An energy absorption impact system as set forth in claim 33, wherein:
said bottom wall is disposed at a predetermined acute angle relative to an adjacent outer portion of said mounting plate to define at least a portion of said generally frustro-pyramidal shape.

35. An energy absorption impact system as set forth in claim 34, wherein:

said predetermined acute angle of said top wall and said bottom wall of said crush member is substantially identical.

36. An energy absorption impact system as set forth in claim 31, wherein:
said predetermined acute angle of said opposite sidewalls is adjusted to vary the energy absorption for a specified impact system.

37. An energy absorption impact system as set forth in claim 1, wherein:
said top wall, said bottom wall and said sidewalls each have a predetermined thickness which is adjusted to vary the energy absorption for a specified impact system.

38. An energy absorption impact system as set forth in claim 1, wherein:
said crush member comprises first and second channel members, each having a substantially identical C-shaped lateral cross-sectional configuration with opposed side edges thereof rigidly interconnected along opposite seams to define said generally frustro-pyramidal shape.

39. An energy absorption impact system as set forth in claim 38, wherein:
said opposed seams are disposed in said top wall and said bottom wall.

40. An energy absorption impact system as set forth in claim 1, wherein:
said mounting plate has a generally flat outer portion, with a marginal edge having a stiffening bead extending along at least a portion thereof; and
said outer portion of said mounting plate is spot welded to an open forward end of the vehicle frame.

41. An energy absorption impact system as set forth in claim 2, including:
a fastener detachably connecting said one wall of said crush member with said tab to facilitate replacement of said crush member.

42. An energy absorption impact system as set forth in claim 41, wherein:
said tab is disposed at an angle relative to the outer portion of said mounting plate which is greater than the predetermined acute angle of said one wall, such that said fastener resiliently biases said tab abuttingly against said one wall to preload said fastener and securely retain the same in place.

43. An energy absorption impact system as set forth in claim 41, including:
a weld nut attached to said tab and receiving said fastener therein.

44. An energy absorption impact system as set forth in claim 1, wherein:
said mounting plate and said crush member are constructed from high strength steel.

45. A method for making an energy absorption impact system for vehicle bumpers, comprising:
forming a mounting plate with a central opening therethrough;
forming a generally box-shaped, sheet metal energy absorbing crush member having a top wall, a bottom wall and oppositely inclined sidewalls arranged in a generally frustro-pyramidal shape, defining a larger end thereof adapted for connection with a vehicle bumper, and a smaller end thereof adapted for connection with said mounting plate;
positioning the smaller end of the crush member on the mounting plate about the central opening;
rigidly fastening the smaller end of the crush member to the mounting plate;
rigidly fastening the mounting plate to an end of a vehicle frame; and
connecting a vehicle bumper to the larger end of the crush member, whereby impact on the vehicle bumper inelastically deforms the top wall, the bottom wall and the opposite sidewalls of the crush member toward the central opening in the mounting plate to absorb energy associated with the impact.

46. A method as set forth in claim 45, wherein:
said mounting plate forming step includes forming at least one tab extending forwardly from the central opening, and rigidly connecting the tab with an adjacent one of the top wall, the bottom wall and the opposite sidewalls of said crush member.

47. A method as set forth in claim 46, wherein:
said tab connecting step includes connecting the tab with an interior surface of the one wall of the crush member, such that the tab folds inwardly with the one wall toward the central opening of the mounting plate upon impact to control energy absorption.

48. A method as set forth in claim 47, wherein:
said tab connecting step includes rigidly connecting the tab to the interior surface of the outermost one of the opposite sidewalls to absorb energy from an impact having a significant side component.

49. A method as set forth in claim 48, wherein:
said tab forming step includes forming the tab integral with the mounting plate to define a one-piece structure.

50. A method as set forth in claim 49, wherein:
said tab forming step includes stamping the tab from material disposed within the central opening and bending the tab forwardly along a fold edge.

51. A method as set forth in claim 50, wherein:
said mounting plate forming step includes forming a stiffening bead about the periphery of the central opening.

52. A method as set forth in claim 51, wherein:
the central opening is defined by a top edge, a bottom edge and opposite side edges; and
said tab forming step includes forming one of the tabs at each of the edges of the central opening and bending the tabs forwardly therefrom.

53. A method as set forth in claim 52, wherein:
said crush member forming step includes positioning at least one of the sidewalls at a predetermined acute angle relative to the adjacent outer portion of the mounting plate to define at least a portion of the generally frustro-pyramidal shape.

54. A method as set forth in claim 53, wherein:
said crush member forming step includes positioning each of the sidewalls at a predetermined acute angle relative to the adjacent outer portion of the mounting plate to define at least a portion of the generally frustro-pyramidal shape.

55. A method as set forth in claim 54, wherein:
said crush member forming step includes positioning the top wall at a predetermined acute angle relative to the adjacent outer portion of the mounting plate to define at least a portion of the generally frustro-pyramidal shape.

56. A method as set forth in claim 55, wherein:
said crush box forming step includes positioning the bottom wall at a predetermined acute angle relative to the adjacent outer portion of the mounting plate to define at least a portion of the generally frustro-pyramidal shape.

57. A method as set forth in claim 56, wherein:
said sidewall positioning step includes positioning each of the sidewalls of the crush member at a substantially identical, predetermined acute angle.

58. A method as set forth in claim 57, wherein:
said top and bottom wall positioning step includes positioning the top wall and the bottom wall of the crush member at a substantially identical, predetermined acute angle.

59. A method as set forth in claim 58, wherein:
said crush member wall positioning step includes adjusting the predetermined acute angle of the top wall, the bottom wall and the opposite sidewalls to achieve the desired energy absorption for a specified impact system.

60. A method as set forth in claim 59, wherein:
said crush member forming step comprises selecting a predetermined wall thickness for the top wall, the bottom wall and the sidewalls to achieve the desired energy absorption for a specified impact system.

61. A method as set forth in claim 60, wherein:
said crush member forming step comprises forming first and second channel members, each having a substantially identical C-shaped lateral cross-sectional configuration, positioning opposed side edges of the channel members together, and rigidly interconnecting the opposed side edges along opposite seams to define the generally frustro-pyramidal shape.

62. A method as set forth in claim 61, wherein:
said channel member connecting step includes forming the opposed seams in the top wall and the bottom wall.

63. A method as set forth in claim 61, wherein:
said channel member connecting step includes forming the opposed seams in the opposite sidewalls.

64. A method as set forth in claim 62, wherein:
said mounting plate forming step includes forming the mounting plate with a generally flat outer portion, and with a marginal edge having a stiffening bead extending along at least a portion thereof.

65. A method as set forth in claim 64, wherein:
said mounting plate fastening step includes spot welding the outer portion of the mounting plate to an open forward end of the vehicle frame.

66. A method as set forth in claim 65, wherein:
said tab connecting step includes inserting threaded fasteners between the top wall, the bottom, the opposite sidewalls and the tabs to facilitate replacement of said crush member.

67. A method as set forth in claim 66, wherein:
said tab forming step includes forming the tabs at an angle relative to the outer portion of the mounting plate which is greater than the predetermined acute angle of the top wall, the bottom wall and the opposite sidewalls, such that the fasteners resiliently bias said tabs abuttingly against the walls to preload the fasteners and securely retain the same in place.

68. A method as set forth in claim 67, including:
attaching weld nuts to the tabs to receive the fasteners therein.

69. A method as set forth in claim 68, wherein:
said mounting plate forming step includes forming the mounting plate from high strength steel.

70. A method as set forth in claim 69, wherein:
said crush member forming step includes forming the crush member from high strength steel.

71. A method as set forth in claim 46, wherein:
said tab connecting step includes rigidly connecting the tab to an interior surface of an outermost one of the opposite sidewalls to absorb energy from an impact having a significant side component.

72. A method as set forth in claim 46, wherein:
said tab forming step includes stamping the tab from material disposed within the central opening and bending the tab forwardly along a fold edge.

73. A method as set forth in claim 45, wherein:
said mounting plate forming step includes forming a stiffening bead about the periphery of the central opening.

74. A method as set forth in claim 45, wherein:
said crush member forming step includes positioning at least one of the sidewalls at a predetermined acute angle relative to the adjacent outer portion of the mounting plate to define at least a portion of the generally frustro-pyramidal shape.

75. A method as set forth in claim 45, wherein:
said crush member forming step includes positioning at least one of the top wall and bottom wall at a predetermined acute angle relative to the adjacent outer portion of the mounting plate to define at least a portion of the generally frustro-pyramidal shape.

76. A method as set forth in claim 74, wherein:
said crush member wall positioning step includes adjusting the predetermined acute angle of the opposite sidewalls to achieve the desired energy absorption for a specified impact system.

77. A method as set forth in claim 45, wherein: said crush member forming step comprises selecting a predetermined wall thickness for the top wall, the bottom wall and the sidewalls to achieve the desired energy absorption for a specified impact system.

78. A method as set forth in claim 45, wherein:
said crush member forming step comprises forming first and second channel members, each having a substantially identical C-shaped lateral cross-sectional configuration, positioning opposed side edges of the channel members together, and rigidly interconnecting the opposed side edges along opposite seams to define the generally frustro-pyramidal shape.

79. A method as set forth in claim 45, wherein:
said mounting plate forming step includes forming the mounting plate with a generally flat outer portion, and with a marginal edge having a stiffening bead extending along at least a portion thereof.

80. A method as set forth in claim 45, wherein:
said mounting plate fastening step includes spot welding an outer portion of the mounting plate to an open forward end of the vehicle frame.

81. A method as set forth in claim 46, wherein:
said tab connecting step includes inserting a threaded fastener between the one wall and the tab to facilitate replacement of said crush member.

82. A method as set forth in claim 81, wherein:
said crush member forming step includes positioning the one wall at a predetermined acute angle relative to the adjacent Outer portion of the mounting plate to define at least a portion of the generally frustro-pyramidal shape; and
said tab forming step includes forming the tab at an angle relative to the outer portion of the mounting plate which is greater than the predetermined acute angle of the one wall, such that the fastener resiliently biases said tab abuttingly against the one wall to preload the fastener and securely retain the same in place.

83. An energy absorption impact system for vehicle bumpers, comprising:
   a mounting plate adapted to be connected with a vehicle frame, and including a central opening extending therethrough, and at least one tab extending forwardly from said central opening; and
   a generally box-shaped, sheet metal energy absorbing crush member having a top wall, a bottom wall and opposite sidewalls arranged in a generally frustro-pyramidal shape, defining a larger end thereof adapted for connection with a vehicle bumper, and a smaller end thereof connected with said mounting plate about said central opening therein by rigid connection of said tab with an adjacent one of said top wall, said bottom wall and said opposite sidewalls, whereby impact on the vehicle bumper inelastically deforms said top wall, said bottom wall and said opposite sidewalls of said crush member toward said central opening in said mounting plate to absorb energy associated with the impact.

84. An energy absorption impact system as set forth in claim 83, wherein:
   said tab is connected with an interior surface of said one wall of said crush member, and folds inwardly with said one wall toward said central opening of said mounting plate upon impact to control energy absorption.

85. An energy absorption impact system as set forth in claim 84, wherein:
   said sidewalls include an innermost sidewall facing a central portion of the vehicle bumper, and an outermost sidewall facing an end portion of the vehicle bumper; and
   said tab is rigidly connected with the interior surface of said outermost sidewall to absorb energy from an impact having a significant side component.

86. An energy absorption impact system as set forth in claim 85, wherein:
   said tab is integral with said mounting plate to define a one-piece structure.

87. An energy absorption impact system for vehicle bumpers, comprising:
   a mounting plate adapted to be connected with a vehicle frame, and including a central opening extending therethrough and a stiffening bead extending about the periphery of said central opening; and
   a generally box-shaped, sheet metal energy absorbing crush member having a top wall, a bottom wall and opposite sidewalls arranged in a generally frustro-pyramidal shape, defining a larger end thereof adapted for connection with a vehicle bumper, and a smaller end thereof connected with said mounting plate about said central opening therein, whereby impact on the vehicle bumper inelastically deforms said top wall, said bottom wall and said opposite sidewalls of said crush member toward said central opening in said mounting plate to absorb energy associated with the impact.

88. An energy absorption impact system for vehicle bumpers, comprising:
   a mounting plate adapted to be connected with a vehicle frame, and including a central opening extending therethrough defined by a top edge, a bottom edge and opposite side edges;
   a tab extending forwardly from each of said edges of said central opening; and
   a generally box-shaped, sheet metal energy absorbing crush member having a top wall, a bottom wall and opposite sidewalls arranged in a generally frustro-pyramidal shape, defining a larger end thereof adapted for connection with a vehicle bumper, and a smaller end thereof connected with said mounting plate about said central opening therein, whereby impact on the vehicle bumper inelastically deforms said top wall, said bottom wall and said opposite sidewalls of said crush member toward said central opening in said mounting plate to absorb energy associated with the impact.

89. An energy absorption impact system for vehicle bumpers, comprising:
   a mounting plate adapted to be connected with a vehicle frame, and including a central opening extending therethrough and a generally flat outer portion, with a marginal edge having a stiffening bead extending along at least a portion thereof; said outer portion of said mounting plate being spot welded to an open forward end of the vehicle frame; and
   a generally box-shaped, sheet metal energy absorbing crush member having a top wall, a bottom wall and opposite sidewalls arranged in a generally frustro-pyramidal shape, defining a larger end thereof adapted for connection with a vehicle bumper, and a smaller end thereof connected with said mounting plate about said central opening therein, whereby impact on the vehicle bumper inelastically deforms said top wall, said bottom wall and said opposite sidewalls of said crush member toward said central opening in said mounting plate to absorb energy associated with the impact.

* * * * *